Figure 1:
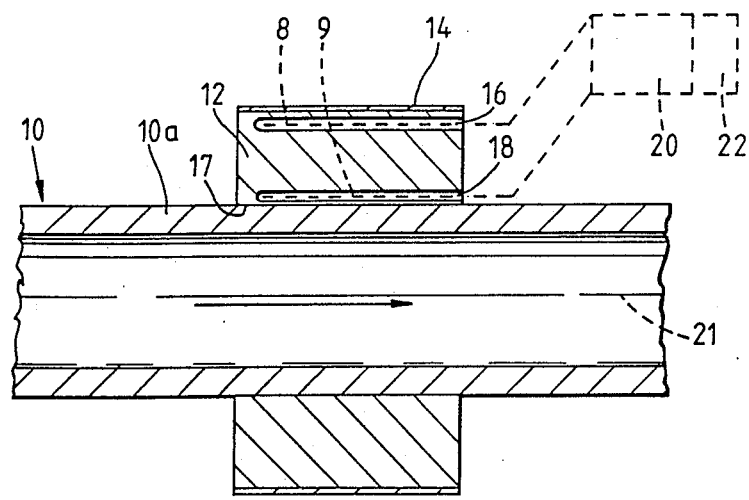

United States Patent [19]

Thomson

[11] Patent Number: 4,968,151
[45] Date of Patent: Nov. 6, 1990

[54] TEMPERATURE MEASUREMENT FOR FLOWING FLUIDS

[75] Inventor: Alexander Thomson, Warrington, United Kingdom

[73] Assignee: The Secretary of State for United Kingdom Atomic Energy Authority in Her Britannic Majesty's Government of the United Kingdom of Great Britain and Northern Ireland, London, England

[21] Appl. No.: 373,526

[22] Filed: Jun. 30, 1989

[30] Foreign Application Priority Data

Jun. 30, 1988 [GB] United Kingdom ............... 8815609

[51] Int. Cl.⁵ ..................... G01K 1/16; G01K 13/02
[52] U.S. Cl. .............................. 374/135; 73/204.19; 73/204.23
[58] Field of Search ............... 374/135, 29, 30, 147, 374/134, 10; 73/204.17, 204.19, 204.23

[56] References Cited

U.S. PATENT DOCUMENTS

| | | | |
|---|---|---|---|
| 1,528,383 | 3/1925 | Schmidt | 374/30 |
| 3,321,974 | 5/1967 | Sterbutzel | 374/134 |
| 3,720,103 | 3/1973 | Adams et al. | 374/29 |
| 3,821,895 | 7/1974 | Sumikawa et al. | 374/30 |
| 4,494,112 | 1/1985 | Streib | 374/30 X |
| 4,527,908 | 7/1985 | Arisi . | |
| 4,577,976 | 3/1986 | Hayashi et al. | 374/30 X |

FOREIGN PATENT DOCUMENTS 2327538 12/1974 Fed. Rep. of Germany .
3527942 12/1987 Fed. Rep. of Germany .

Primary Examiner—Daniel M. Yasich
Attorney, Agent, or Firm—William R. Hinds

[57] ABSTRACT

The temperature of fluid (gas or liquid) flowing in a duct 10a having axis 21 is measured using a collar 12 having an inner face 17 embracing the tube and having two axial bores 16, 18 at different lateral distances from the duct axis which receive temperature sensors 8, 9 connected to recording and monitoring devices 20, 22. A heater 14 is provided on the outside of the collar and when there is no lateral heat flux in the collar and the wall of the duct the temperature of the fluid equals the temperature of the sensors.

5 Claims, 1 Drawing Sheet

TEMPERATURE MEASUREMENT FOR FLOWING FLUIDS

This invention relates to the measurement of the temperature of fluids flowing in ducts, particularly in ducts made of low conductivity materials such as ceramics and glasses. In such circumstances, it is normally necessary to arrange for a temperature sensor to penetrate the duct wall to avoid errors due to temperature gradients in the duct wall.

According to the present invention apparatus for measuring the temperature of a fluid flowing in a duct, the duct having a wall of relatively low thermal conductivity, comprises an annular ceramic body having an inner face arranged to fit around the duct wall in relatively good thermal contact therewith, the body defining a first chamber and a second chamber, the first chamber being remote from the inner face and the second chamber being near to the inner face, a first temperature sensor locatable in the first chamber and a second temperature sensor locatable in the second chamber, means for heating the body at the circumferential periphery thereof, and means for monitoring the outputs of the sensors, whereby in operation the temperature may be recorded at which the temperatures sensed by the sensors at the first chamber and at the second chamber are substantially identical.

Preferably the body comprises a collar having an axis and is provided with two paraxial passages respectively for reception of the temperature sensors. The body is conveniently provided with a heater at that face opposite to its duct-contacting face.

Also according to the invention a method of measuring the temperature of a fluid flowing in a duct, the duct comprising relatively low thermal conductivity material, comprises surrounding a portion of the duct with an annular body comprising ceramic material in thermal contact with the exterior of the duct, providing temperature sensors at a first location and at a second location in the body, the positions of the sensors being selected so that the first location is farther from the duct than the second location and such that the difference in temperature between the second location and the first location is substantially larger than the difference in temperature between the duct and the second location, applying heat to the circumferential periphery of the body, monitoring the outputs of the sensors, and recording the outputs thereof when a condition is achieved in which the temperatures at the first location and at the second location are substantially identical.

Figure 2:
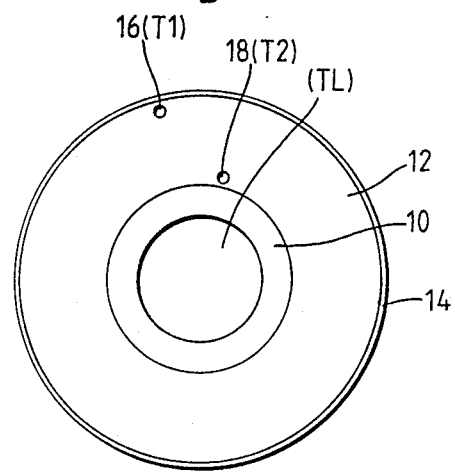

One embodiment of the invention will now be described by way of example only with reference to the accompanying drawings, in which:

FIG. 1 is a longitudinal sectional view of a duct provided with apparatus in accordance with the invention; and FIG. 2 is an end view in direction 2—2 in FIG. 1.

Referring to the drawings, in this example the low thermal conductivity flow duct 10 is a cylindrical alumina tube. Surrounding and embracing the tube is a circular cylindrical collar 12 of machinable glass ceramics. This is cemented in position to ensure good thermal contact between the intersurface of the tube and the inner face 17 of the collar. An electrical heating element 14 is formed around the peripheral surface of the collar 12 and two paraxial pockets 16, 18 are drilled in the collar 12 parallel to the duct axis to accommodate resistance temperature detectors (sensors) 8, 9 respectively measuring temperatures T1 and T2 (FIG. 2), the heating element 14 and the temperature detectors being cemented into place. The detectors are connected to monitoring apparatus 20 and are mounted at different distances laterally of the duct axis 21.

Providing the fluid temperature TL is higher than the external ambient temperature, and before the heater element 14 is enlarged, there will be a temperature gradient in the duct wall $10a$ and the collar 12 such that $TL > T2 > T1$ (FIG. 2). If the heater element 14 is now energised, a value of heating current may be maintained at which the temperature at T2 and T1 as measured by monitoring instrumentation 20 are substantially identical. In these circumstances there can be no radial heat flux, not only in the collar, but also in the duct wall. Consequently, $T2 = T1 = TL$. The apparatus 20 includes means 22 for recording the outputs of the detectors when there is substantially no radial heat flux in the body and in the duct wall. The duct wall is not penetrated.

The measurement of T2 and T1 and the control of the heating current may be achieved by a variety of conventional techniques. The accuracy to which the fluid temperature TL may be measured depends primarily on the precision of the sensors at T2 and T1 and the heating current control. The choice of material and dimensions for the collar are also significant in determining the ultimate accuracy. The radial thermal resistance should be so arranged that under normal heat flow conditions (heater not energised), $T2 - T1$ is large compared with $TL - T2$. Any error in current adjustment to set $T1 = T2$ will be diminished when extrapolating to TL.

The collar may be made from castable ceramic or the complete system may be formed from suitable metals. The temperatures T1 and T2 may be measured using any convenient sensors, e.g. thermocouples.

We claim:

1. Apparatus for measuring the temperature of a fluid flowing in a duct, the duct having a wall of relatively low thermal conductivity, the apparatus comprising an annular ceramic body having an inner face arranged to fit around the duct wall in relatively good thermal contact therewith, the body defining a first chamber and a second chamber, the first chamber being remote from the inner face and the second chamber being near to the inner face, a first temperature sensor locatable in the first chamber and a second temperature sensor locatable in the second chamber, means for heating the body at the circumferential periphery thereof, and means for monitoring the outputs of the sensors, whereby in operation the temperature may be recorded at which the temperatures sensed by the sensors at the first chamber and at the second chamber are substantially identical.

2. An apparatus as claimed in claim 1, wherein the lateral distance between the first chamber and the second chamber is such that, in operation, before the heating means is energised, the difference between the temperature at the first sensor and the second sensor is substantially larger than the difference between the temperatures at the second sensor and the wall of the duct.

3. Apparatus as claimed in claim 2, wherein the first chamber and the second chamber extend parallel to the longitudinal axis of the duct.

4. A method of measuring the temperature of a fluid flowing in a duct, the duct comprising relatively low thermal conductivity material, the method comprising surrounding a portion of the duct with an annular body comprising ceramic material in thermal contact with the exterior of the duct, providing temperature sensors at a first location and at a second location in the body, the positions of the sensors being selected so that the first location is farther from the duct than the second location and such that the difference in temperature between the second location and the first location is substantially larger than the difference in temperature between the duct and the second location, applying heat to the circumferential periphery of the body, monitoring the outputs of the sensors, and recording the outputs thereof when a condition is achieved in which the temperatures at the first location and at the second location are substantially identical.

5. A method as claimed in claim 4, wherein the first location and the second location extend parallel to the longitudinal axis of the duct.

* * * * *

UNITED STATES PATENT AND TRADEMARK OFFICE
CERTIFICATE OF CORRECTION

PATENT NO.   : 4,968,151
DATED        : November 6, 1990
INVENTOR(S)  : Alexander Thomson It is certified that error appears in the above—identified patent and that said Letters Patent is hereby corrected as shown below:

Title page:
    The assignee is changed to --UNITED KINGDOM ATOMIC ENERGY AUTHORITY, London, England--.

Signed and Sealed this

Twenty-fifth Day of February, 1992

Attest:

HARRY F. MANBECK, JR.

*Attesting Officer*      *Commissioner of Patents and Trademarks*